United States Patent [19]

Dormeyer et al.

[11] Patent Number: 5,071,940
[45] Date of Patent: Dec. 10, 1991

[54] CURING AGENT MIXTURE FOR CURING ALKALINE PHENOL/FORMALDEHYDE RESINS

[75] Inventors: Dieter Dormeyer, Fussgoenheim; Winfried Kochersperger, Monzernheim; Franz Wolf, Edenkoben; Eberhard Pfuetze, Nackenheim, all of Fed. Rep. of Germany

[73] Assignee: BASF Aktiengesellschaft, Ludwigshafen, Fed. Rep. of Germany

[21] Appl. No.: 476,810

[22] Filed: Feb. 8, 1990

[30] Foreign Application Priority Data

Feb. 10, 1989 [DE] Fed. Rep. of Germany ....... 3903953

[51] Int. Cl.$^5$ .................. C08G 8/04; C08G 14/02
[52] U.S. Cl. ................................. 528/129; 528/139; 528/144; 528/147; 528/161
[58] Field of Search ............... 528/129, 139, 144, 147, 528/161

[56] References Cited

U.S. PATENT DOCUMENTS

| | | |
|---|---|---|
| 3,949,149 | 4/1976 | Cherubim et al. . |
| 4,311,621 | 1/1982 | Nishizawa et al. ................ 260/17.2 |
| 4,758,478 | 7/1988 | Daisy et al. ......................... 528/147 |

FOREIGN PATENT DOCUMENTS

| | | |
|---|---|---|
| 259042 | 3/1988 | European Pat. Off. . |
| 1653266 | 2/1972 | Fed. Rep. of Germany . |
| 84970 | 3/1984 | World Int. Prop. O. . |

OTHER PUBLICATIONS

Forest Products Journal, Clark et al., Jul./Aug. 1988, pp. 71–75.

*Primary Examiner*—John Kight, III
*Assistant Examiner*—T. Mosley
*Attorney, Agent, or Firm*—Keil & Weinkauf

[57] ABSTRACT

A curing agent mixture for curing alkaline phenol/formaldehyde resins contains
A) a pulverulent or fibrous filler and
B) a carbonic ester.

11 Claims, No Drawings

CURING AGENT MIXTURE FOR CURING ALKALINE PHENOL/FORMALDEHYDE RESINS

The present invention relates to a curing agent mixture for curing alkaline phenol/formaldehyde resins, a process for the production of woodworking materials using this curing agent mixture and these woodworking materials.

In the production of woodworking materials by gluing veneers with alkaline phenol/formaldehyde resins, the veneers have to be dried to a water content of from 0 to 7% by weight since the phenol resins cure only very slowly in the presence of large amounts of water. This drying is time-consuming and energy-consumptive.

For gluing wood veneers having water contents greater than 7% by weight, a number of solutions have been proposed but are not completely satisfactory. R.J. Clark et al., Forest Products Journal 38, Jul./Aug. (1988), 71-75, describes novel resins for gluing veneers having high moisture contents. This is a system modified with natural carbohydrates. Natural substances which differ in quality depending on their origin are used. Some starting materials, especially glucose, are relatively expensive. Furthermore, many process steps are necessary.

French Patent 1,550,847 describes the addition of carbonates for the production of woodworking materials which have high resistance to hot water.

German Published Application DAS 2,363,782 points out the difficulties in using alkylene carbonates. When introduced into the phenol resin/binder liquor, partial curing and formation of solid particles occur. When liquid alkylene carbonates are used, gelatinous particles are formed. The use of alkylene carbonate in 30-42% strength by weight aqueous formaldehyde has therefore been proposed, but this is useless for achieving the object of the present invention.

It is an object of the present invention to provide a curing agent for alkaline phenol/formaldehyde resins which are suitable for gluing wood veneers having a water content of more than 7% by weight.

We have found that this object is achieved by a curing agent mixture for curing alkaline phenol/formaldehyde resins, containing
A) a pulverulent or fibrous filler and
a carbonic ester.

The present invention furthermore relates to a process for the production of woodworking materials by gluing veneers with phenol/formaldehyde resins which are cured using the novel curing agent mixture, and to these woodworking materials themselves.

Regarding the components of the curing agent mixture, the following may be stated:

Pulverulent or fibrous fillers may be used as component A). They may be organic or inorganic. Examples of organic fillers are flours, such as the cereal flours rye flour, wheat flour, coarse wheat flour and cornflour. However, starch, coconut shell flour, olive kernel flour, apricot kernel flour or flours of leguminous fruits are also suitable. Examples of inorganic fillers are chalk, kaolinite, bentonite and wollastonite. Coconut shell flour is preferably used.

Component A) is advantageously used in an amount of from 80 to 99, preferably from 90 to 98, particularly preferably from 95 to 97, % by weight, based on the curing agent mixture of A) and B).

Carbonic esters are used as component B). Acyclic and cyclic organic carbonic esters are suitable. Examples of acyclic carbonic esters are dimethyl carbonate, methyl ethyl carbonate, diethyl carbonate and dibutyl carbonate. Suitable cyclic carbonic esters are, for example, ethylene carbonate, propylene carbonate, vinylidene carbonate and halogenated cyclic carbonic esters. Ethylene carbonate and propylene carbonate are preferably used.

Component B) is advantageously used in a amount of from 1 to 20, preferably from 2 to 10, particularly preferably from 3 to 5, % by weight, based on the curing agent mixture of A) and B).

Paraformaldehyde and other assistants, such as resorcinol or anticaking agents, may be used as component C). For example, they may act as accelerators or prevent caking of the curing agent mixture. When component C) is present, the following curing agent mixtures have proven useful:

from 50 to 98, preferably from 65 to 95, particularly preferably from 80 to 93, % by weight of component A), from 1 to 20, preferably from 5 to 15, % by weight of component B) and from 1 to 30, preferably from 10 to 20, % by weight of component C), the percentages by weight of components A), B) and C) summing to 100% by weight.

The carbonic ester/filler mixture is prepared by simple stepwise addition of the liquid carbonic ester to the filler or mixture of fillers. This can be carried out in a mixing vessel but is also advantageously effected in a mill during milling of, for example, coconut shell flour. Uniform mixing is important for the preparation of the glue liquor and the quality of gluing. There must be no localized moisture. The curing agent mixture must have a good powder consistency and must not cake at any point. To achieve this object, anticaking agents, such as hydrophobic silica, may also be added in difficult cases.

The alkaline phenol/formaldehyde resins, i.e. the resols, which are cured by means of the novel curing agent mixture are known. Such resols are aqueous solutions of phenol/formaldehyde condensates having a formaldehyde/phenol molar ratio of from 1.5 to 2.7, preferably from 1.8 to 2.4, and still containing alkali in the form of sodium hydroxide or potassium hydroxide. They may additionally contain resorcinol. The viscosity of such resins is from 500 to 1,500, preferably from 800 to 1,200, mPa.s, measured at 20° C., but may also be lower. This applies in particular when urea has additionally been dissolved in the resin solution, which is described, for example, in DE-C-33 46 153, DE-A-37 08 739 and DE-A-37 08 740.

The solids contents of the phenol/formaldehyde resin solutions are in general from 40 to 65, preferably from 45 to 60, particularly preferably from 48 to 55, % by weight. The solids contents are determined by drying in a drying oven at 120° C for two hours. The alkali content is advantageously from 2 to 15, preferably from 5 to 12, % by weight. The molar ratio of formaldehyde to phenol is advantageously from 1.5 to 2.7, preferably from 1.8 to 2.4. The resorcinol content may be from 0 to 5, preferably from 2 to 3, % by weight.

The curing agent mixture is added to this phenol formaldehyde resin solution while stirring. It is advantageous to add the curing agent mixture in an amount such that the content of carbonic ester in the glue liquor is 0.1-10, preferably 0.2-5, % by weight.

This resin/curing agent solution is referred to as the glue liquor and is uniform and free of lumps when a liquid carbonic ester is added. This glue liquor is advantageously applied to veneers which have not been pre-dried and which have a water content (veneer moisture content) of 12% by weight or more, and the said veneers are placed one on top of the other in the desired number and are cured at from 100° to 150° C., preferably from 110° to 140° C., in a press. The veneer sheets exhibit uniform gluing and excellent mechanical properties. They are weather-resistant according to DIN 68,705, Part 2.

EXAMPLE 1

Curing Agent Mixture 1

11 kg of coconut shell flour were mixed with 1 kg of paraformaldehyde. 0.5 kg of propylene carbonate was sprayed onto this mixture, which was further homogenized until a non-blocking powder had been obtained.

Glue Liquor 1

12.5 kg of curing agent mixture 1 were stirred into 100 kg of a 48% strength by weight aqueous phenol/-formaldehyde resin condensed under alkaline conditions and having a formaldehyde/phenol molar ratio of 2.04, a sodium hydroxide content of 9.2% by weight and a viscosity of 1,150 mPa.s (20° C.).

EXAMPLE 2

Curing Agent Mixture 2

2 kg of resorcinol were added to 12.5 kg of curing agent mixture 1.

Glue Liquor 2

14.5 kg of curing agent mixture 2 were added to 100 kg of the phenol/formaldehyde resin solution from Example 1.

EXAMPLE 3

Curing Agent Mixture 3

78 kg of coconut shell flour were mixed with 22 kg of paraformaldehyde to give a homogeneous powder.

Glue Liquor 3

4 kg of curing agent mixture 3 and 8 kg of coconut shell flour were added to 100 kg of the phenol/-formaldehyde resin solution from Example 1.

EXAMPLE 4

Glue Liquor 4

0.5 kg of propylene carbonate was added subsequently to glue liquor 3 and the mixture was homogenized.

Veneers having different moisture contents were coated with these glue liquors and were processed using the data stated in the Table. The minimum pressing time is the time after which the veneer is no longer delaminated by the steam pressure when the pressure is relieved.

The strength according to DIN 68,705 (AW 100) is the force required to displace two veneer layers horizontally with respect to one another against the strength of the adhesive bond.

TABLE

| Example No. | 1 | 2 | 3 Comp. Example | 4. Comp. Example |
|---|---|---|---|---|
| Nature of the liquor | Homogeneous | Homogeneous | Homogeneous | Inhomogeneous |
| Glue coat | Uniform | Uniform | Uniform | Non-uniform |
| Glue application (g/cm$^2$) | 180 | 180 | 180 | 180 |
| Type of wood | Beech | Gaboon | Beech | Gaboon |
| Veneer thickness (mm) | 1.5 | 1.5 | 1.5 | 1.5 |
| Number of veneer layers | 7 | 7 | 7 | 7 |
| Pressing temperature (°C.) | 140 | 115 | 140 | 115 |
| Compressive pressure (N/mm$^2$) | 1.5 | 0.8 | 1.5 | 0.8 |
| Pressing time (min) | 3–8 | 8–10 | 3–8 | 8–10 |
| Veneer moisture content (% by weight of water) | 7  13 | 13  7 | 7  13 | 7  13 |
| Minimum pressing times (min) | 3  9 | 8  8 | 4  8 | 10  10 |
| Strength AW 100 (N/mm$^2$) | 1.59  1.9 | 1.01  2.2 | 0.81  0.49 | *  * |

*No data since the values varied very greatly

As is evident from the Table, the strengths in the case of moist veneers (13% by weight of water) are in general lower than in the case of dry veneers (7% by weight of water).

The strengths in the Examples according to the invention are more than twice as high as those of the prior art, and the addition of the liquid propylene carbonate in Example 4 led to nonuniform gluing and hence greatly varying strengths.

We claim:

1. A curing agent mixture in the form of a non-caking powder for curing alkaline phenol/formaldehyde resins, containing, as essential components,
    A) a pulverulent or fibrous filler and
    B) a carbonic ester.

2. A curing agent mixture as defined in claim 1, which contains
    A) from 80 to 99% by weight of a pulverulent or fibrous filler and
    B) from 1 to 20% by weight of a carbonic ester.

3. A curing agent mixture as defined in claim 1, containing
    A) from 50 to 98% by weight of a pulverulent or fibrous filler,
    B) from 1 to 20% by weight of a carbonic ester and
    C) from 1 to 30% by weight of further assistants.

4. A curing agent mixture as defined in claim 1, containing flours of cereals, starch, coconut shells, olive kernels, apricot kernels and/or leguminous fruits as component A).

5. A curing agent mixture as defined in claim 1, containing chalk, kaolinite, bentonite and/or wollastonite as component A).

6. A curing agent mixture as defined in claim 1, containing a cycloaliphatic carbonic ester as component B).

7. A curing agent mixture as defined in claim 1, containing propylene carbonate as component B).

8. A curing agent mixture as defined in claim 1, containing paraformaldehyde as component C).

9. A curing agent mixture as defined in claim 1, containing paraformaldehyde and resorcinol as components C).

10. A process for the production of a woodworking material for gluing wood veneers with an alkaline phenol/formaldehyde resin, which comprises mixing A) a pulverulant or fibrous filler and B) a carbonic ester to from a non-caking powderous curing agent mixture and adding the mixture to the alkaline phenol/formaldehyde resin.

11. A process for the production of a woodworking material by gluing wood veneers having a water content of from 10 to 25% by weight with an alkaline phenol/formaldehyde resin, wherein a curing agent mixture as defined in claim 1 is added to the resin.

* * * * *